Dec. 19, 1961         F. J. LUKETA         3,013,356
                    FLOATS FOR TRAWL NETS
Filed Aug. 24, 1959                      2 Sheets-Sheet 1
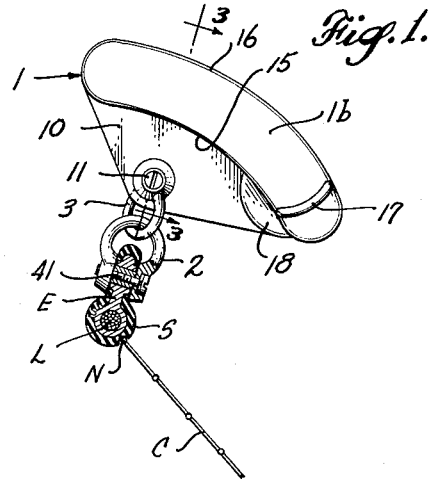
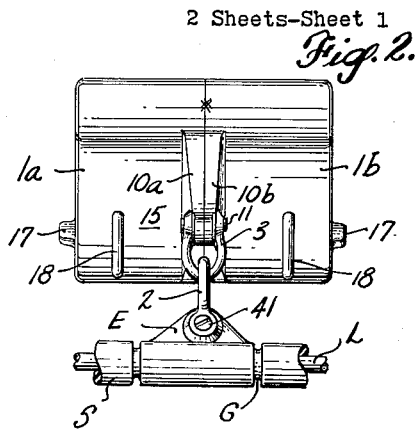
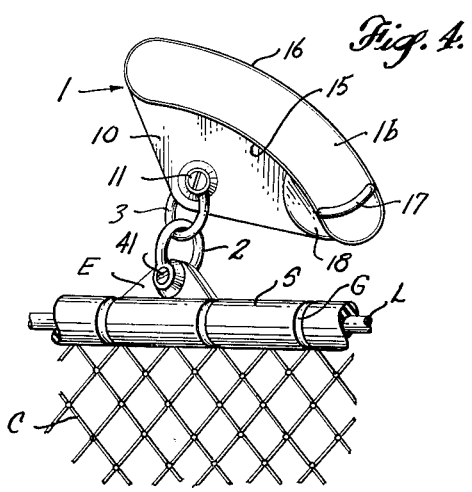
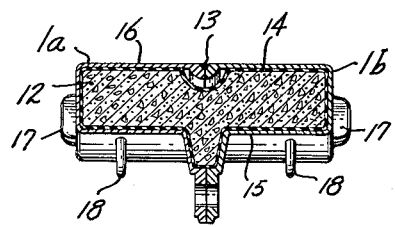
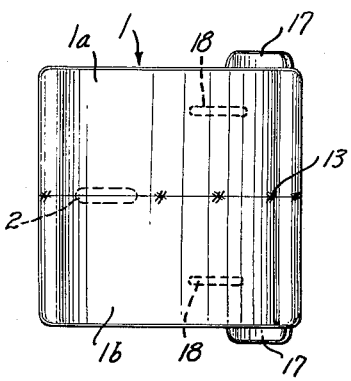
INVENTOR.
FRANK J. LUKETA
BY
Reynolds, Beach & Christensen
ATTORNEYS Dec. 19, 1961   F. J. LUKETA   3,013,356
FLOATS FOR TRAWL NETS
Filed Aug. 24, 1959   2 Sheets-Sheet 2

INVENTOR.
FRANK J. LUKETA
BY
Reynolds, Beach & Christensen
ATTORNEYS

United States Patent Office 3,013,356
Patented Dec. 19, 1961

3,013,356
FLOATS FOR TRAWL NETS
Frank J. Luketa, 5567 Greenwood Ave., Seattle, Wash.
Filed Aug. 24, 1959, Ser. No. 835,471
12 Claims. (Cl. 43—9)

Trawl nets of a type disclosed in a companion application Serial No. 834,030, filed August 17, 1959 include buoyed-up curtain lines whereon curtains hang by their upper edge, to sweep the bottom with their lower edge, whereto weights are attached. The curtain lines connect to the upper bosom of the net body, a float line connecting them across the bosom. The ground line across the lower bosom is buoyed slightly above the bottom. The codend is buoyed up along its upper side, to prevent its rolling laterally. A series of buoyant bodies or floats is required and they are semi-permanently affixed at each such location, aggregating an appreciable number and bulk for the entire net. All such lines or elements are hereinafter termed "curtain lines or the like," or more shortly, "lines."

Such nets are intended to be hauled aboard the trawling vessel by reeling the net in upon a winch drum upon deck. Floats, being affixed, are reeled in along with the net, and when the net is set it is merely reeled off, and the floats must go out with the net. They must be of a type that will not become entangled in the net, either in reeling in or in reeling off, hence must be close-coupled to the net or to the line to which they are connected, with little relative flexibility, and must be so shaped and arranged that in setting the net they will not be covered by the netting, but will assume the correct attitude and orientation in the water, above and clear of the netting. This requires a maximum of position control by the lines over the floats, just as the position of the lines is controlled by the net itself, and a minimum of flexibility in the connection between lines, net, and floats.

The number of floats used, and the unavoidable total bulk of all the floats, requires that each float be of minimum bulk. Upwardly acting or buoyant forces are therefore produced, according to this invention, not necessarily or even primarily by inherent buoyance, but largely by water reaction forces as the floats are drawn through the water, leaving the static buoyance of each float, and hence its bulk, a minimum, or even a negative, so that the float when static tends to sink. At the same time, the shape of the floats is such as to produce the desired buoyant force by proper hydrodynamic design of hydrofoil float surfaces, such as will produce a minimum of drag when correctly oriented by its line. Moreover, each float should be stable in use, as to direction of advance, as to depth, and as to attitude. It goes without saying that the floats must be inherently resistant to the crushing forces applicable to them at operating depths, and of such design as to be readily made and attached to or detached from the net.

The present invention may be said to have two primary objects: (a) to anchor the float to its line by anchorage means so oriented in use by the drag of the net which effects a given orientation of the line, that the float will automatically assume the correct attitude to produce an upwardly acting or buoyant force upon the net, and (b) to employ as the anchorage means a limitedly flexible interconnection between the line and the float, whereby the float can not depart greatly from its intended orientation to the in-use attitude and extent of the line, and whereby it will not foul in the net but will seek and maintain its proper attitude when the net, its line, and itself are being set.

With the above objects in mind, and others as will appear more fully hereinafter, the present invention comprises the novel float for the use indicated, as shown in two representative forms in the accompanying drawings, and as will be more fully explained hereinafter, and the novel features whereof will be pointed out in the appended claims.

FIGURE 1 is a side elevational view of a float in an attitude somewhat resembling that of use, in relation to a curtain line, although it is not possible in such a view to illustrate the correct angular relationship between the two as viewed from above.

FIGURE 2 is a frontal elevation of the same float and curtain line, again somewhat distorted in the same angular relationship.

FIGURE 3 is a cross-sectional view through such a float, of a preferred structural form, at line 3—3 of FIGURE 1.

FIGURE 4 is similar to FIGURE 1, with the curtain line anchorage connection or eye more nearly correctly oriented relative to the float.

FIGURE 5 is a bottom plan diagram, illustrating the angular attitude, about a vertical axis, of the float and the anchorage relative to the curtain line.

FIGURES 6, 7, 8, and 9 are views similar, respectively, to FIGURES 1 to 4, showing a modified form of float and attachment means.

Figure 10:
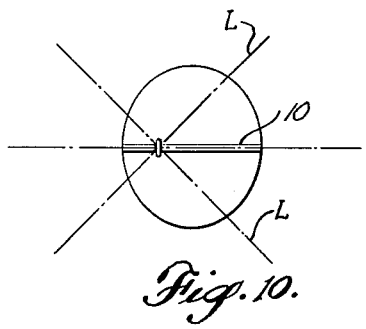

FIGURE 10 is a bottom plan diagram, similar to FIGURE 5, illustrating the angular attitude of this form of float relative to alternatively angled curtain lines.

Reference is made to the companion application on the trawl net, Serial No. 834,030, filed August 17, 1959, to illustrate the location, disposition and manner of use of such floats. Normally a series of such floats would be distributed along the length of and attached closely to a curtain line L or other elements of the net such as are to be buoyed up. This curtain line L, in accordance with the companion application, supports a depending curtain C which hangs to the bottom and inclines downwardly and rearwardly during bottom trawling, being weighted along its lower edge by a weight preferably of the nature shown in a further companion application, Serial No. 834,032, filed August 17, 1959. Normally, throughout its length, the curtain line is wrapped or seized with a rope, or other type of seizing as indicated at S, which is somewhat more compressible than is the curtain line. The curtain line, by reason of the rather constant orientation of the curtain whereto it is secured, tends to maintain a given attitude in the water during use, as will be more fully explained later.

The flotation means, in the preferred form, comprises three principal parts, namely, a body 1 which usually (but not necessarily) would be at least somewhat buoyant, a first shackle 2, pinned at 41 to an eye E or other outstanding anchorage base fixed in a given attitude upon the curtain line shackle 2 and a second shackle 3 interconnected with the shackle 2 and pinned at 11 to a selected point near the lower point of the main keel 10 of the float body 1. The shackle 3 is angled relative to the plane of shackle 2, as will be explained more fuly hereinafter. Such an arrangement is short, and affords but little flexibility sidewise for adjustment of the attitude of the keel relative to the direction of drag, for it is desirable to maintain each float as close as possible to the float line, so that it will not entangle itself in the net when reeled in with the net onto a winch drum, nor when unreeled therefrom. The curtain lines L diverge forwardly from the net, their angle to the direction of drag ideally approaching 40°. The close coupling of the floats to the float line and the consequent slight rotational flexibility (as viewed in plan) of the interconnection makes highly desirable some provision for maintaining the plane of the main keel 10 always in the direction of drag. Accordingly, the shackle 3 (or the shackle 2, or both thereof) is twisted with relation to its pin 11 by about 40°, to right or to left, depending upon whether the float is intended for the curtain line at one side of the net or at the opposite side. This twist allows the curtain line and the outstanding anchorage base E to assume the intended 40° divergence, yet the keel 10 of the float will lie in a vertical plane parallel to the direction of drag. It is difficult to show this twist in elevational views such as FIGURES 1 and 2, but it is shown in FIGURES 4, 5 and 10. The pin 11 or the pin 41 can be disengaged to free a float from the curtain line, and although these pins do not necessarily permit pivoting, they may do so.

The attitude of each float, as viewed transversely of the direction of drag, and its upward lifting force, is governed not primarily by its static buoyance but by its hydrofoil shape. Its under surface 15 is concave, and its upper surface 16 is convex, complemental thereto. The source of drag forces applied to a net element and by the latter applied to the float at a given point, is in the water reaction to the curtain C or like mesh element. The point of application of drag forces, at 11, is so located that water reaction forces upon the float, acting above and behind the point 11, will effect an upward tilting of the leading edge, yet will produce sufficient upward force at the trailing edge that the float remains stable in attitude. The ideal point of application of drag forces to the float to achieve minimum bulk would be close to the concave surface 15, but the float would then tend to become unstable, and to flutter up and down at leading and trailing edges. The point 11 is a happy medium. If a greater upward tilt at the trailing edge is desired, one or several reverse hydrofoil surfaces 17 may be employed. The main keel 10 affords longitudinal stability, and this can be supplemented by supplemental keels 18, such keel means being always oriented in the direction of intended advance of the float. The twist of shackle 3 is always coordinated with the direction of the keel means, and so but slight rotational flexibility about an upright axis is required, or permitted, in the interconnection between the line and the float.

The buoyant body 1 may be built in various ways, two of which are shown. The form shown in FIGURES 1 to 5, inclusive, comprises two half shells, designated 1a and 1b to distinguish them, which can be constructed almost identically although oppositely. Each is formed with a flange 10a or 10b, see FIGURE 2, outstanding at the side of the buoyant body which is intended to be lowermost in use, these flanges meeting and being held in close association by suitable means. In this manner the flanges 10a and 10b cooperate to define the keel-like longitudinal stabilizing surfaces. In the preferred form, that shown in FIGURES 1 to 5, inclusive, the interior of the hollow shell is filled with a rigid non-compressible but buoyant material, as indicated at 12, this being for example wood flakes embedded within a hardened lightweight resin. The junction between the two halves 1a and 1b of the shell round about their joint, may be sealed by a weld 13. The core 12 may be encased, within the shell, within a waterproof coating indicated at 14.

In the form shown in FIGURES 6, 7, 8 and 9, the hollow shell 1 is also thus filled, and screws 13a through the shell halves are threaded into the core. The filling resists great crushing pressure that otherwise might destroy a hollow float.

The eye E, as has already been stated, is held in a predetermined attitude relative to the curtain line L. In use the curtain C trails downwardly and rearwardly from its curtain line L at an angle of slope that remains rather constant; see FIGURE 1. This is due to water reaction or drag upon the mesh of the net element, while pulled downwardly by its bottom weights. The marginal twine of the curtain's upper edge is secured at successive points to the line L, or to its protective seizing S, circumferential grooves G being shown for the reception of the ties or other securing means. Each eye is mounted upon its curtain line, and the seizing S, preferably of molded rubber or rubber composition, is bonded to the line-encircling base of the eye. Now if the seizing, and so in effect the eye, is provided with a notch N (FIGURE 1) in correct angular relationship, about the line as a center, to the outstanding plane of the eye, and if the upper mesh of the curtain is held tensioned, within that notch, the downward and rearward pull of the curtain tends to hold the eye against rotation about the line L, and so to retain the eye in the intended upwardly and backwardly inclined attitude shown in FIGURE 1.

This is of importance during setting of the net. It is set by unreeling it from its winch drum. As each float reaches the water, its supporting curtain line L remains tensioned, and its freely trailing curtain has been sloped rearwardly and downwardly by water drag and its weight, and so tends to rotate the eye E of that float, if need be, into the correct upwardly and rearwardly sloping attitude. Because of the short and somewhat inflexible coupling between the eye and the float, the positioning of the eye, as just described, insures that the float will not fall forwardly beneath the net, but will be brought uppermost, above the net and curtain line, and generally into its correct attitude. Water reaction on its hydrofoil surfaces will complete its correct positioning.

The shackle 2 permits but limited relative rotational movement of the shackle 3, about an upright axis, and the shackle 3 is non-rotative relative to the keel 10, except about the transverse pin 11. This provides a close-up coupling of minimum bulk, and assures stability of the float relative to the line L. The angled deformation or twist of shackle 3 is to right or to left, depending upon which float line the float is attached to, or if the float is attached to the codend, or near the middle of the float line across a bosom, no angling thereof is required. While no great departure beyond the preferred 40° angling is possible, if the angle of a float line relative to the direction of drag varies somewhat beyond 40°, there is sufficent flexibility between shackles 2 and 3 to permit this, and to maintain the float headed in the direction of drag.

The float as shown in FIGURES 1 to 5 is approximately square in plan, whereas the float 1d of FIGURES 6 to 10 is nearly round. Its under surfaces 15a are flat, although relatively of dihedral or V-shape, and still constitute hydrofoil surfaces. The upper surface 16a is convex, and is also a hydrofoil. The line-attached element 2a is now in the nature of a clamp, whereby a compressible split sleeve 20 has its flanges 21 clamped and held about the line L and its seizing S by the pins 24 that join the two clamping elements 22a and 22b. Each jaw of the clamp is vulcanized to the sleeve 20. Each jaw has also sister hooks 23, 23a that engage a link 32, which is linked to a link 33 engaged by sister hooks 19, 19a formed as part of the keel 10.

This arrangement allows sufficient flexibility that rights and lefts are no longer necessary but adds somewhat to the bulk of each float and the possibility that it may become fouled in the net.

Figure 6:
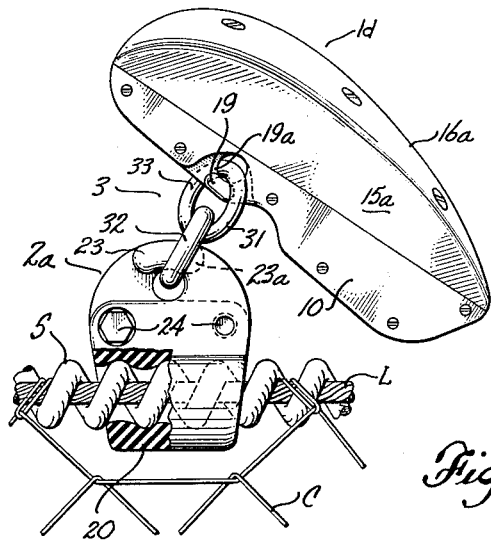
Figure 7:
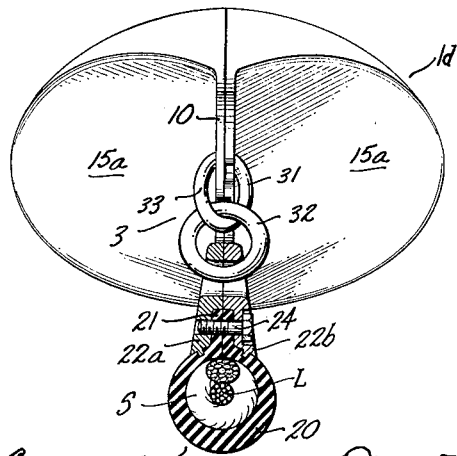
Figure 9:
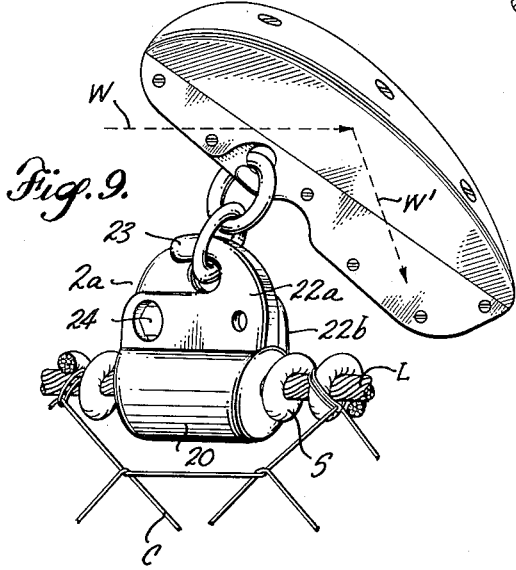
Figure 8:
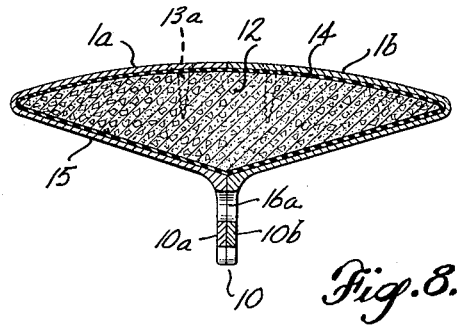

Such floats when drawn through the water develop a water reaction force, such as W in FIGURE 9, that by reaction downwardly as at W', or by a hydrofoil action in the form of FIGURES 1 to 5, tends to maintain the float in a stable planing attitude; the keel 10 keeps the float headed in the direction of drag. The water reaction forces produce strong upward components, whereby the bulk required for static flotation is not primarily relied upon, and so is minimized. The float is located close to the line or other net element to which it is attached, which further minimizes bulk, and the likelihood of fouling or disorientation of the floats during hauling or setting. Each float is simply made, and will resist all crushing forces likely to be imposed thereon in use.

Although the description above has discussed the water drag of a freely trailing curtain and its effect in orienting a curtain line, and hence an eye and the float secured thereto, the same principles apply to any mesh element of the net, and any line or float secured thereto. Any such mesh element that is dragged through the water, e.g. the overhang ahead of the codend, produces resistance or drag and tends to be thereby oriented in a given attitude. The line which drags it through the water, which in the example just given would be the float line across the upper bosom, will assume a corresponding attitude about its axis, if it is affixed non-rotatively relative to the mesh element. Assuming that eyes E are secured to such a line in a fixed attitude, these eyes will assume an intended attitude relative to the mesh element, and the float secured to such eye will be automatically thereby so oriented as to be presented in proper attitude to the water. Thereby the water reaction forces upon the floats, to whatever mesh element they may be secured, will automatically produce the intended upward component at the float. Where, therefore, reference is made in the claims to "a float line or like element," the float line is intended as illustrative, and the quoted expression is intended as generic.

I claim as my invention:

1. Flotation means for securement to a trawl net element which when such element is dragged through the water in use assumes a given attitude relative to the horizontal and to the direction of advance, comprising a body having water reaction surfaces arranged, when said body is in its intended attitude, to produce an upwardly acting force and to maintain said body directed forwardly in the direction of advance, and a limitedly flexible interconnection between said body and the net element, which includes an anchorage base intended to be affixed to the net element for disposition in a given attitude relative to the horizontal and to the direction of advance by the net element to which it is affixed when the latter is in its given attitude of use, and a limitedly flexible means interconnecting said body and said anchorage base to dispose and maintain the body in its intended attitude when dragged through the water.

2. Flotation means as in claim 1, wherein the body has a longitudinally concavely curved lower surface and a convexly curved upper surface, constituting its water reaction surfaces.

3. Flotation means as in claim 2, including stabilizing surfaces curved reversely to its water reaction surfaces, and located adjacent its trailing edge.

4. Flotation means as in claim 1, including a main keel located along the fore and aft median plane of the body, and wherein the point of interconnection with the body is at the lower forward point of said main keel, spaced below the body.

5. Flotation means as in claim 5, including a main keel located along the fore and aft median plane, and the attaching means including an eye affixed to the net element in a given attitude, constituting the anchorage base, and a first shackle attached to said eye, and the interconnecting means including a second shackle interlinked with said first shackle and attached to said main keel, at least one of said shackles being twisted to rotate the keel at a given acute angle to the eye.

6. Flotation means as in claim 1, including a keel means depending from the body and oriented in the direction of advance, an eye constituting the anchorage base and having its plane oriented upwardly and rearwardly from its net element, and angularly relative to the direction of advance, and the interconnecting means consisting of a first shackle attached to and extending above the eye, with its plane oriented transversely to the plane of the eye, and a second shackle attached to and depending beneath the keel means adjacent its center and interlinked with the first shackle, the plane of the second shackle being twisted at an angle to the direction of advance complemental to the angular orientation of the eye relative to the direction of advance.

7. Flotation means, such as in use may be distributed along the curtain line or like element of a trawl net, which line is intended for disposition at a given angle relative to the intended direction of advance, said flotation means comprising a body which in use is acted upon by an upward force, keel means on the body tending to guide it always in the intended direction of advance, a clamp having an outstanding anchorage base, and formed for grasping the line to prevent rotation of the clamp about the line, and an interconnection between said anchorage base and the lower portion of the body, which interconnection is only sufficiently flexible to allow adjustment of the position of the body to position its keel means at the given angle with respect to the line in the event of minor departure of the line from the given angular relation, so that the body may proceed in the intended direction of its advance despite any such minor variation.

8. Flotation means as in claim 7, the buoyant body being formed with planing surfaces arranged, when the body is correctly oriented, to produce the upwardly acting force as it is drawn through the water and directed by its keel means.

9. Flotation means as in claim 7, wherein the keel means generally increase in depth towards the rear end of the buoyant body, and the flexible interconnection connects thereto intermediate the ends but nearer the forward end.

10. Flotation means as in claim 7, wherein the flexible interconnection consists of two interlinked loops, one thereof being affixed to the anchorage base and the other to the lower portion of the buoyant body, for limited angular rotation about an upright axis of the buoyant body relative to the curtain line.

11. Flotation means as in claim 7, wherein the keel means generally increase in depth towards the rear end of the buoyant body, and the flexible interconnection connects thereto intermediate the ends but nearer the forward end.

12. Flotation means, for securement to a curtain line or like element of a trawl net, which when such element is dragged through the water in use assumes a given attitude relative to the horizontal and to the direction of advance, comprising a body having water reaction surfaces arranged, when said body is in its intended attitude, to produce an upwardly acting force and to maintain said body directed forwardly in the direction of advance, attaching means for securement fixedly to the line, and including an outstanding eye for fixation to and extending lengthwise of the line, and said attaching means having a longitudinal notch disposed at such angle about the line from the eye as corresponds to the intended angle in use between the eye and the curtain, an edge of the curtain lying within said notch and by the pull of the curtain in use orienting the eye at the intended angle, said attaching means also including a limitedly flexible interconnection between the body and the eye, to minimize disorientation of the body from its intended position of use above the line and directed in the direction of advance.

References Cited in the file of this patent

UNITED STATES PATENTS

| 1,974,278 | Johnson | Sept. 18, 1934 |

FOREIGN PATENTS

| 76,133 | Denmark | July 20, 1953 |
| 385,585 | Great Britain | Mar. 31, 1931 |
| 673,571 | Great Britain | June 11, 1952 |
| 690,749 | Great Britain | Apr. 29, 1953 |